(12) United States Patent
Tateyama (10) Patent No.: US 9,921,301 B2
(45) Date of Patent: Mar. 20, 2018

(54) ACOUSTIC WAVE MEASURING APPARATUS

(71) Applicant: CANON KABUSHIKI KAISHA, Tokyo (JP)

(72) Inventor: Jiro Tateyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 14/037,513

(22) Filed: Sep. 26, 2013

(65) Prior Publication Data
US 2014/0098630 A1 Apr. 10, 2014

(30) Foreign Application Priority Data

Oct. 9, 2012 (JP) .................................. 2012-224135

(51) Int. Cl.
*G01S 7/52* (2006.01)
*G01S 15/89* (2006.01)

(52) U.S. Cl.
CPC ...... *G01S 7/52046* (2013.01); *G01S 7/52047* (2013.01); *G01S 15/8915* (2013.01); *G01S 15/8993* (2013.01)

(58) Field of Classification Search
CPC ............. G01S 7/52046; G01S 7/52047; G01S 5/8915; G01S 5/8993
USPC ........................................................ 367/138
See application file for complete search history.

(56) References Cited

U.S. PATENT DOCUMENTS 5,655,536 A * 8/1997 Takamizawa ........ G10K 11/346
600/447
5,882,309 A * 3/1999 Chiao ................. G01S 15/8925
310/336
5,897,501 A * 4/1999 Wildes ................ G01S 7/52049
600/444
6,089,096 A 7/2000 Alexandru ....................... 73/626
6,160,340 A * 12/2000 Guo ........................ G10K 11/02
310/334

(Continued)

FOREIGN PATENT DOCUMENTS

JP H09(1997)-000526 1/1997
JP H11(1999)-070111 3/1999

OTHER PUBLICATIONS

JPO Office Action dated Aug. 23, 2016 in counterpart Japanese patent application 2012-224135, with translation.

*Primary Examiner* — James R Hulka
*Assistant Examiner* — John T Nolan
(74) *Attorney, Agent, or Firm* — Fitzpatrick, Cella, Harper & Scinto (57) ABSTRACT

An acoustic wave measuring apparatus includes: a probe having a plurality of transducers that are capable of converting an acoustic wave into an electric signal and vice versa; a transmitting and receiving unit that includes a plurality of channels connected to the probe, generates an acoustic wave from the probe, and obtains a reception signal of the probe; a plurality of switches that switch connections between the transducers and the channels; and an image generating unit that generates an image from the reception signal. The transducers include a central element row and an end portion element row, and the plurality of channels are respectively connected to the transducers on the central element row and the transducers on the end portion element row alternately via the switches.

22 Claims, 11 Drawing Sheets (56) References Cited

U.S. PATENT DOCUMENTS

| | | | |
|---|---|---|---|
| 6,183,419 B1* | 2/2001 | Wildes | G01S 7/52046 600/447 |
| 2005/0215893 A1* | 9/2005 | Barnes | G01S 15/8925 600/437 |
| 2009/0043206 A1* | 2/2009 | Towfiq | A61B 8/0825 600/447 |
| 2009/0096327 A1* | 4/2009 | Kristoffersen | B06B 1/0622 310/335 |
| 2011/0082372 A1* | 4/2011 | Tateyama | A61B 8/0833 600/443 |
| 2011/0230750 A1* | 9/2011 | Tateyama | A61B 8/14 600/407 |
| 2012/0022373 A1* | 1/2012 | Tateyama | G01S 7/52034 600/437 |
| 2013/0072798 A1* | 3/2013 | Tateyama | A61B 8/14 600/444 |
| 2013/0218016 A1* | 8/2013 | Tateyama | A61B 8/4444 600/459 |
| 2014/0121518 A1* | 5/2014 | Baba | A61B 5/0035 600/440 |

* cited by examiner

|  | SW1 | SW2 | SW3 | SW4 | SW5 | SW6 | SW7 | SW8 | SW9 | SW10 | SW11 | SW12 | SW13 | SW14 | SW15 | SW16 |
|---|---|---|---|---|---|---|---|---|---|---|---|---|---|---|---|---|
| S1 | on | on | on | on | on | on | on | on | off | off | off | off | off | off | off | off |
| S2 | off | on | on | on | off | on | on | on | on | off | off | off | on | off | off | off |
| S3 | off | off | on | on | off | off | on | on | on | on | off | off | on | on | off | off |
| S4 | off | off | off | off | off | off | off | off | on | on | on | on | on | on | on | off |
| S5 | off | off | on | on | off | off | off | off | off | off | on | off | on | on | on | on |
| S6 | on | on | on | on | off | off | off | off | off | off | off | off | on | on | on | on |

ACOUSTIC WAVE MEASURING APPARATUS

BACKGROUND OF THE INVENTION

Field of the Invention

The present invention relates to an acoustic wave measuring apparatus.

Description of the Related Art

An ultrasound probe including transducers that have a function for transmitting and receiving ultrasound waves is employed in an ultrasound diagnostic apparatus used in medical image diagnosis. When an ultrasound beam formed from a composite wave of ultrasound waves is transmitted from the probe toward a test subject, reflection occurs in regions of differing acoustic impedance in an interior of the test subject, or in other words on a tissue boundary. An echo signal generated by the reflection is received by the probe, and by reconstructing an image on the basis of an intensity of the echo signal, a tissue condition in the interior of the test subject can be expressed in the form of two-dimensional image data (a tomographic slice image).

Further, by mechanically scanning the test subject in an elevation direction (a direction intersecting an element arrangement direction) using a probe (a 1D array probe) on which the transducers are arranged one-dimensionally, consecutive tomographic slice images are obtained. As a result, three-dimensional image data representing a large test region can be generated.

Patent Literature 1: Japanese Patent Application Laid-Open No. H11-070111
Patent Literature 2: Japanese Patent Application Laid-Open No. H09-000526

SUMMARY OF THE INVENTION

An image resolution of a single tomographic slice image obtained when three-dimensional image data are generated from tomographic slice images obtained consecutively using a 1D array probe will now be investigated.

In a lateral direction (the arrangement direction of the transducers), an electronic scan with an ultrasound beam is performed using the plurality of arranged transducers, and therefore focus control is possible, enabling an improvement in the image resolution. In the elevation direction, however, the focus is fixed, and therefore the image resolution in a depth direction decreases.

Hence, to enable aperture control in the elevation direction, various types of multi-row probes such as a 1.25D array probe, a 1.5D array probe, and a 2D array probe have been developed. With a 1D array, an elevation aperture is fixed, but in a multi-row probe having a 1.25D array, a plurality of acoustic lenses are combined to make elevation aperture control possible.

Further, with a 1.5D array, the aperture and focus position in the elevation direction can be varied dynamically, but are limited in being symmetrical about a center position of the array. Note that with a 2D array, electronic apodization and control of the focus position and direction can be performed without limitations in both the lateral direction and the elevation direction.

Here, the focus position of a 1.25D array during elevation aperture control is limited to a range determined in stages, and therefore, in comparison with a 1.5D array having a dynamically variable focus position, an improvement in the depth direction resolution cannot be achieved over an entire region.

Japanese Patent Application Laid-Open No. H11-070111 (Patent Literature 1) describes control combining three focus stages in the elevation direction using a 1.25D array, but in comparison with the dynamic focus of a 1.5D array, an improvement effect over the entire region in the depth direction is insufficient.

Further, although it is possible to control the focus position dynamically by making the elevation aperture variable using a 1.5D array, the number of circuits used to transmit and receive the ultrasound waves must be at least doubled in relation to the number of lateral apertures.

In a conventional example described in Japanese Patent Application Laid-Open No. H09-000526 (Patent Literature 2), a time division operation is performed by dividing a 1.5D array into four in the elevation direction. In this case, however, four times as many transmission/reception circuit channels as lateral apertures are required.

The present invention has been designed in consideration of the problems described above, and an object thereof is to improve an image resolution of a tomographic slice image without increasing the number of transmission/reception circuit channels when generating three-dimensional image data using an ultrasound probe having a 1.5D array.

The present invention provides an acoustic wave measuring apparatus comprising:

a probe having a plurality of transducers that are capable of converting an acoustic wave into an electric signal and vice versa;

a transmitting and receiving unit that includes a plurality of channels connected to the probe, generates an acoustic wave by applying an electric signal to the probe, and receives an electric signal converted from an acoustic wave received by the probe as a reception signal;

a switching unit including a plurality of switches for switching connections between the plurality of transducers and the plurality of channels; and an image generating unit that generates image data on the basis of the reception signal, wherein the plurality of transducers of the probe include a central element row arranged in a first direction, and an end portion element row positioned to sandwich the central element row in a second direction that intersects the first direction, and the plurality of channels are respectively connected to the transducers on the central element row and the transducers on the end portion element row alternately via the switches.

According to the present invention, the image resolution of a tomographic slice image can be improved without increasing the number of transmission/reception circuit channels when generating three-dimensional image data using an ultrasound probe having a 1.5D array.

Further features of the present invention will become apparent from the following description of exemplary embodiments with reference to the attached drawings.

DESCRIPTION OF THE EMBODIMENTS

Preferred embodiments of the present invention will be described below with reference to the drawings. Note, however, that dimensions, materials, shapes, relative positions, and so on of constituent components described below are to be modified appropriately in accordance with a configuration of an apparatus to which the invention is applied and various conditions, and are not intended to limit the scope of the present invention to the following description.

An acoustic wave measuring apparatus according to the present invention is an apparatus that uses an ultrasound wave echo technique to obtain characteristic information relating to an interior of a test subject serving as a measurement subject in the form of image data by transmitting an ultrasound wave to the test subject and receiving a reflected wave (an echo wave) that is reflected by and propagated through the interior of the test subject. The characteristic information obtained here is information reflecting differences in an acoustic impedance of tissue in the interior of the test subject.

An acoustic wave according to the present invention is typically an ultrasound wave, but includes elastic waves known as sound waves, ultrasound waves, and acoustic waves. In the following description, an ultrasound diagnostic apparatus that generates characteristic information used in a medical diagnosis of a test subject and image data reflecting the characteristic information on the basis of transmitted and received ultrasound waves will be described as an example of the acoustic wave measuring apparatus. Note, however, that the actual test subject is not limited to a living organism, and the acoustic wave measuring apparatus may be used for purposes other than diagnosis, such as internal exploration.

First Embodiment (Configuration and Functions of Apparatus)

Figure 1:
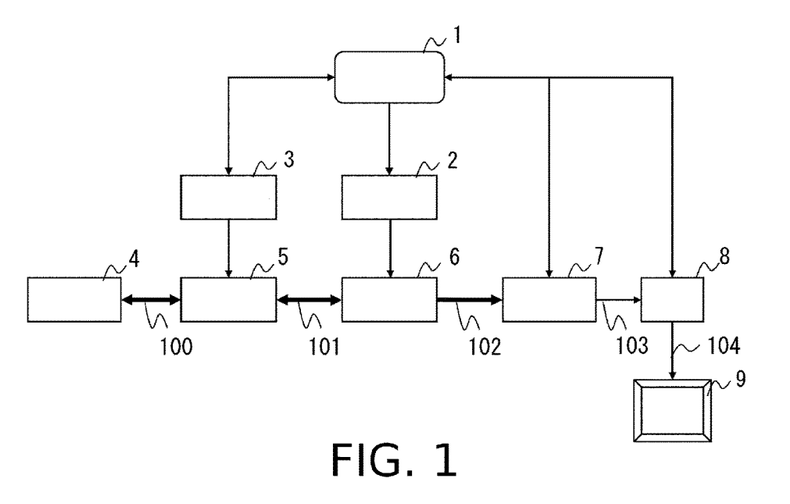
FIG. 1 is a view showing an overall configuration of an ultrasound diagnostic apparatus according to the present invention.

FIG. 1 is a view showing an overall configuration of the ultrasound diagnostic apparatus according to the present invention. An MPU 1 is operated via software to perform main control of the entire apparatus. For example, the MPU 1 controls respective control units on the basis of commands and information from an input operating unit. A transmission/reception control unit 2 and a switch control unit 3 control a transmission/reception circuit unit 6 and a switch circuit unit 5, respectively. A transmission/reception signal 100 from the transmission/reception circuit unit 6 is input into a probe 4 via the switch circuit unit 5.

The probe 4 has a transducer array constructed by arranging transducers for N channels in one or a plurality of rows. The probe 4 may be constituted by transducers in which electrodes are formed at respective ends of a piezoelectric material (a piezoelectric body). Examples of piezoelectric bodies include a piezoelectric ceramic such as lead zirconium titanate (PZT), and a piezoelectric polymer material such as polyvinylidene difluoride (PVDF).

During ultrasound wave transmission, pulse wave or continuous wave electric signals 100 are applied to the transducers of the probe 4. As a result, the piezoelectric bodies expand and contract such that ultrasound pulse waves or continuous waves are generated from the respective transducers. By synthesizing these ultrasound waves, a transmission beam is formed. During ultrasound wave reception, on the other hand, propagated ultrasound waves are received by the respective transducers, causing the piezoelectric bodies to expand and contract, and as a result, the electric signals 100 are generated. The generated electric signals 100 are taken in as transmission/reception signals 101. Hence, the transducers are capable of converting ultrasound waves into electric signals and vice versa.

Figure 2:
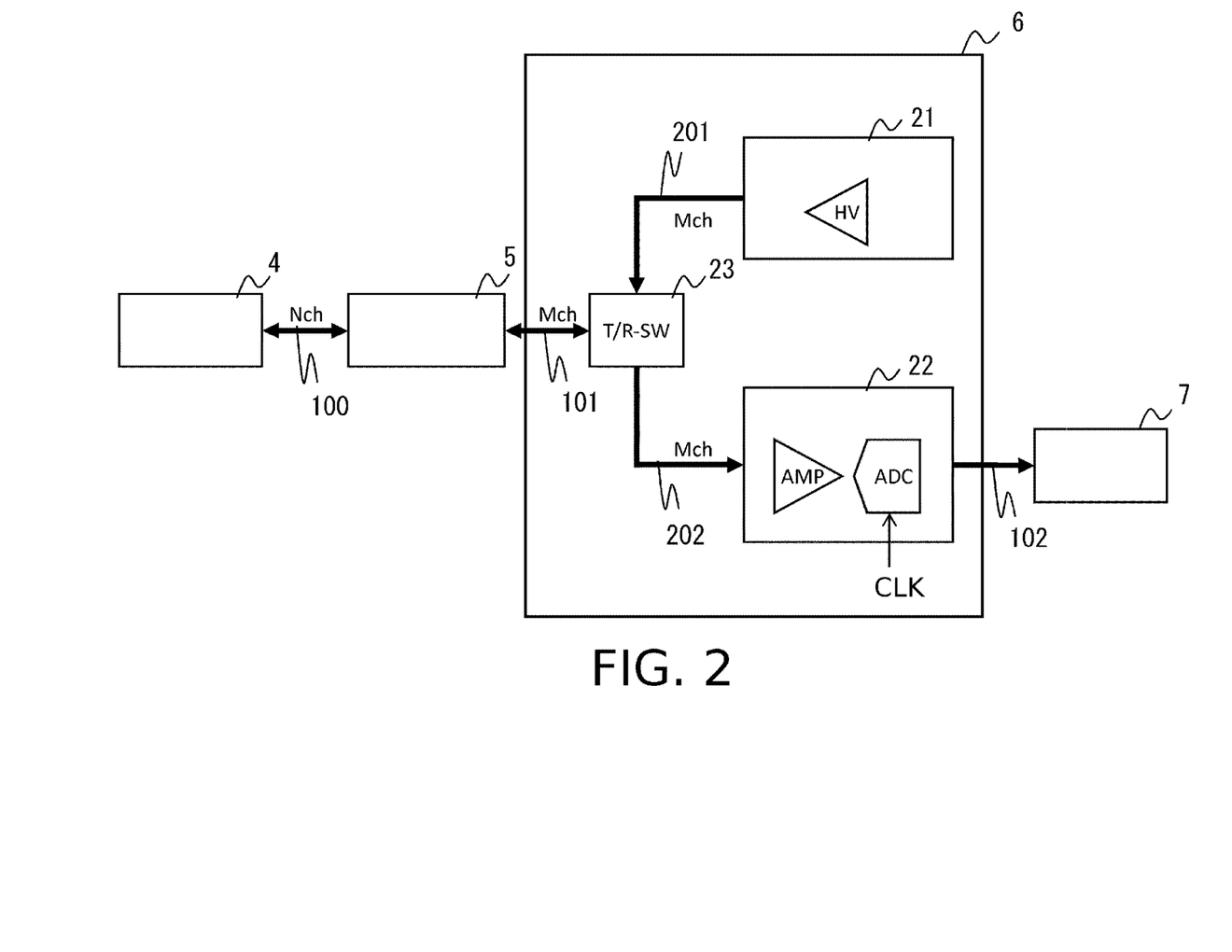
FIG. 2 is a view showing a configuration of a transmission/reception circuit unit.

FIG. 2 is a view showing a configuration of the transmission/reception circuit unit 6. A transmission circuit 21 outputs M channels' worth of transmission analog signals 201 to the N channels' worth of transducers constituting the probe 4. A reception circuit 22 takes in the M channels' worth of reception analog signals 202 from N channels' worth of weak electric signals 100 output by the N channels' worth of transducers. A T/R switch circuit 23 switches between transmitting the transmission analog signals 201 from the transmission circuit 21 to the switch circuit unit as the transmission/reception signals 101 and transmitting the transmission/reception signals 101 from the switch circuit unit 5 to the reception circuit 22 as the reception analog signals 202 in accordance with a transmission/reception switch timing. Hence, the transmission/reception signal includes both a transmission analog signal and a reception analog signal.

The transmission circuit 21 generates ultrasound waves by applying the transmission analog signals 201, which are generated by a high voltage pulser circuit (HV), to the transducers of the probe 4 in the form of the electric signal 100. The reception circuit 22 implements analog amplification processing by inputting the weak electric signals 100 output by the transducers of the probe 4 into an amplification circuit (AMP) in the form of the reception analog signal 202. A/D conversion processing is then performed on output signals from the AMP for each of the channels using an A/D converter circuit (ADC) in synchronization with a sampling clock (CLK), whereby the output signals from the AMP are output as reception digital signals 102.

Figure 3:
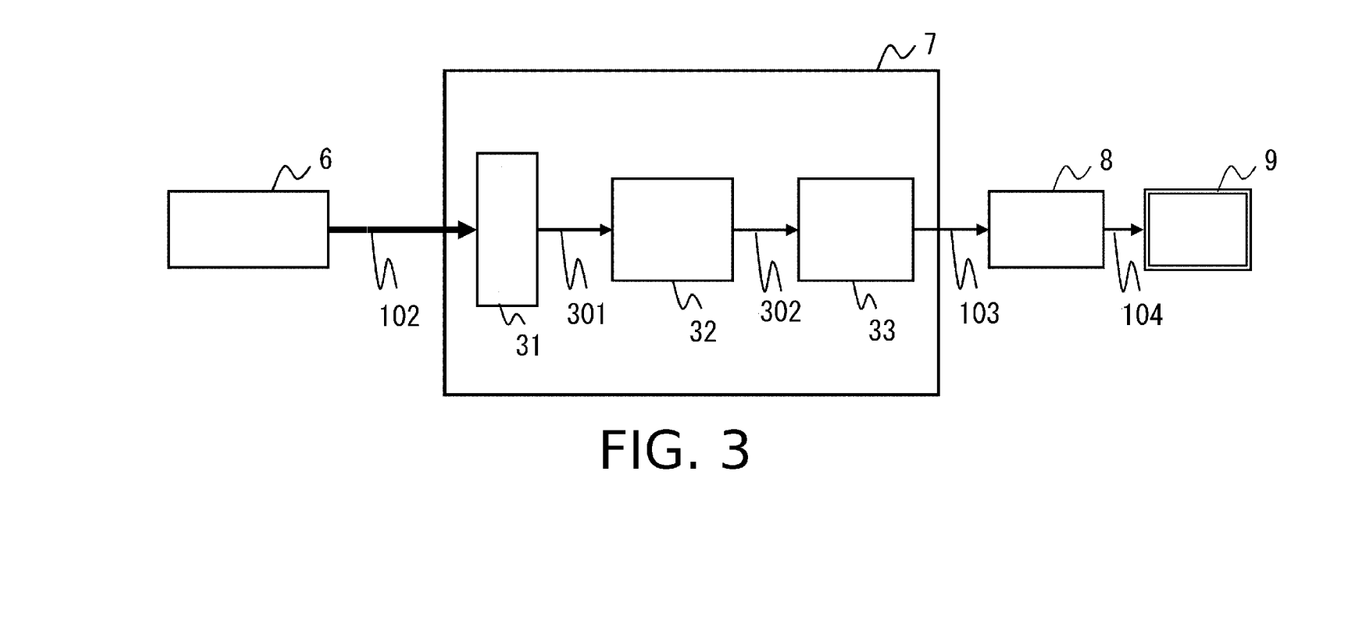
FIG. 3 is a view showing a configuration of an image generating unit.

FIG. 3 is a view showing configurations from an image generating unit 7 to a display unit 9. The reception digital signals 102 output from the transmission/reception circuit unit 6 are processed by a phase matching circuit 31, a signal processing circuit 32, and an image processing circuit 33. As a result, a tomographic slice image 103 known as a B mode image is generated.

A digital scan converter (DSC) 8 outputs a video signal 104 from the input tomographic slice image 103 in accordance with a timing of a horizontal synchronization signal. The display unit 9 performs image display from the input video signal 104.

(Scanning Method)

Figure 4A:
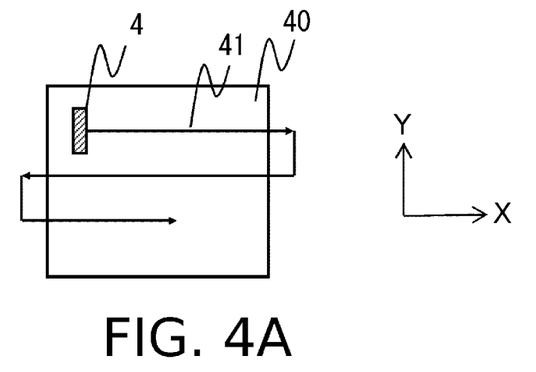
FIGS. 4A and 4B are views showing a mechanical scan performed by a probe.

FIG. 4A is a view showing an operation for obtaining three-dimensional image data of a large inspection region 40 by moving the probe 4 (here, a 1D array probe) mechanically along an elevation direction movement path 41. The probe 4 is moved at a constant speed so that the tomographic slice image 103 is obtained repeatedly in each position on the movement path 41. Three-dimensional image data of the entire inspection region are obtained by arranging the obtained tomographic slice images 103 closely side by side. At this time, the elevation direction corresponds to an X direction, a lateral direction corresponds to a Y direction, and a depth direction of the test subject corresponds to a Z direction.

Figure 4B:
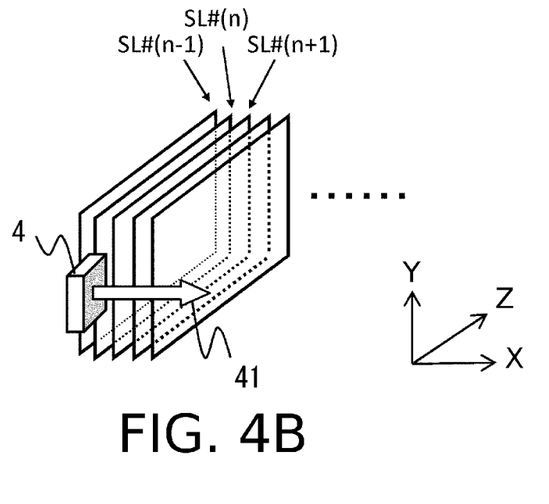

FIG. 4B shows a scanning procedure executed to obtain the tomographic slice images 103 sequentially in order of SL# (n−1), SL# (n), SL# (n+1) while moving the probe 4 continuously along the elevation direction movement path 41. The respective tomographic slice images 103 are output in the elevation direction at fixed period intervals. Either a method (a stop and repeat method) of repeatedly moving and stopping the probe 4 alternately and capturing an image each time the probe 4 is stopped or a method of capturing images while moving the probe 4 continuously may be used as the operation of the probe 4. When the probe 4 is moved continuously, the tomographic slice images 103 are not strictly orthogonal to a movement direction. To facilitate description, however, it is assumed here that the tomographic slice images 103 are orthogonal.

As is evident from FIG. 4B, gaps determined by a scanning speed and an image capturing speed are formed between the respective tomographic slice images 103. Therefore, to generate three-dimensional image data suitable for diagnosis, it is necessary to improve a resolution not only in the lateral direction but also in the elevation direction.

(Conventional Probe)

Figure 5A:
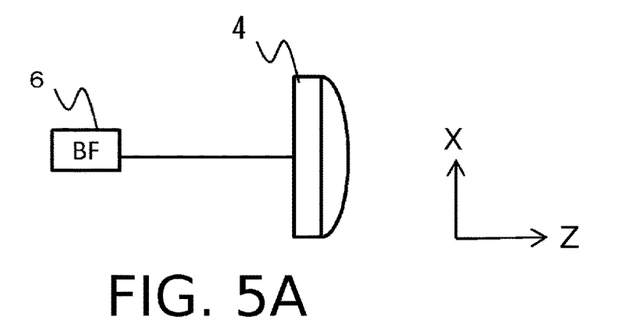
FIGS. 5A to 5C are views showing elevation direction cross-sections of probes according to conventional examples.
Figure 5B:
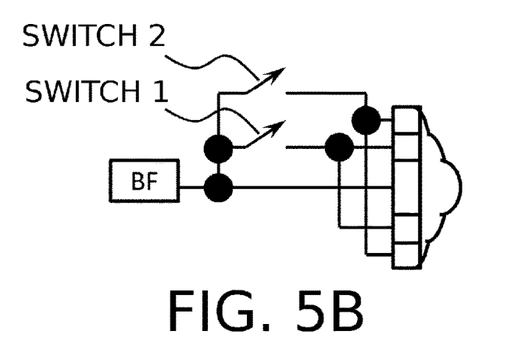
Figure 5C:
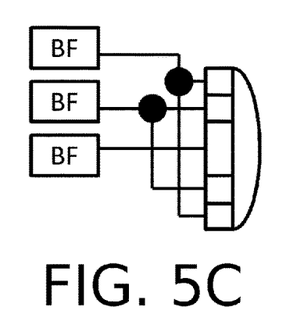

FIG. 5 is a view showing elevation direction cross-sections of various probes having different element arrays. Each drawing shows a manner in which the probe 4, having received a signal from each channel of the transmission/reception circuit unit 6 functioning as a beam former (BF), forms ultrasound beams. FIG. 5A shows a structure of a conventional 1D array, with which it is possible to converge the ultrasound beams on a fixed focus position set by an acoustic lens but not possible to modify the focus position.

FIG. 5B shows a structure of a conventional 1.25D array in which the transducers of the probe 4 are divided in the elevation direction. By combining different acoustic lenses with the respective divided transducers, the ultrasound beams can be converged on focus positions set in three stages by the lenses. The focus position can be controlled by switching a switch.

More specifically, three patterns exist, namely a case in which switches 1, 2 are both OFF (Case 1), a case in which switch 1 is ON and switch 2 is OFF (Case 2), and a case in which switch 1 is OFF and switch 2 is ON (Case 3). In Case 1, only a central transducer is driven. In Case 2, the central transducer and two transducers adjacent thereto are driven simultaneously. In case 3, the central transducer and transducers at respective ends thereof are driven simultaneously.

FIG. 5C shows a structure of a conventional 1.5D array in which the transducers are divided in the elevation direction into three types, namely the central transducer, the two transducers adjacent thereto, and the transducers at the respective ends, and signals from the channels of the BF are input respectively into the three types of transducers. This configuration enables tripartite aperture control centering on the central transducer, and therefore the focus position can be set at a desired point through beam forming control. Beam forming control can be used particularly effectively in a shallow region (a region in which a Z direction distance is comparatively small). However, an aperture size cannot be increased in a shallow region, and therefore acoustic lens characteristics are often used as is during focus processing. When this 1.5D array is used, the transmission/reception circuits must be provided with three times as many channels as those of the 1D array and the 1.25D array, leading to an increase in a circuit scale of the apparatus.

(Configuration of Switch Circuit Unit)

Figure 6:
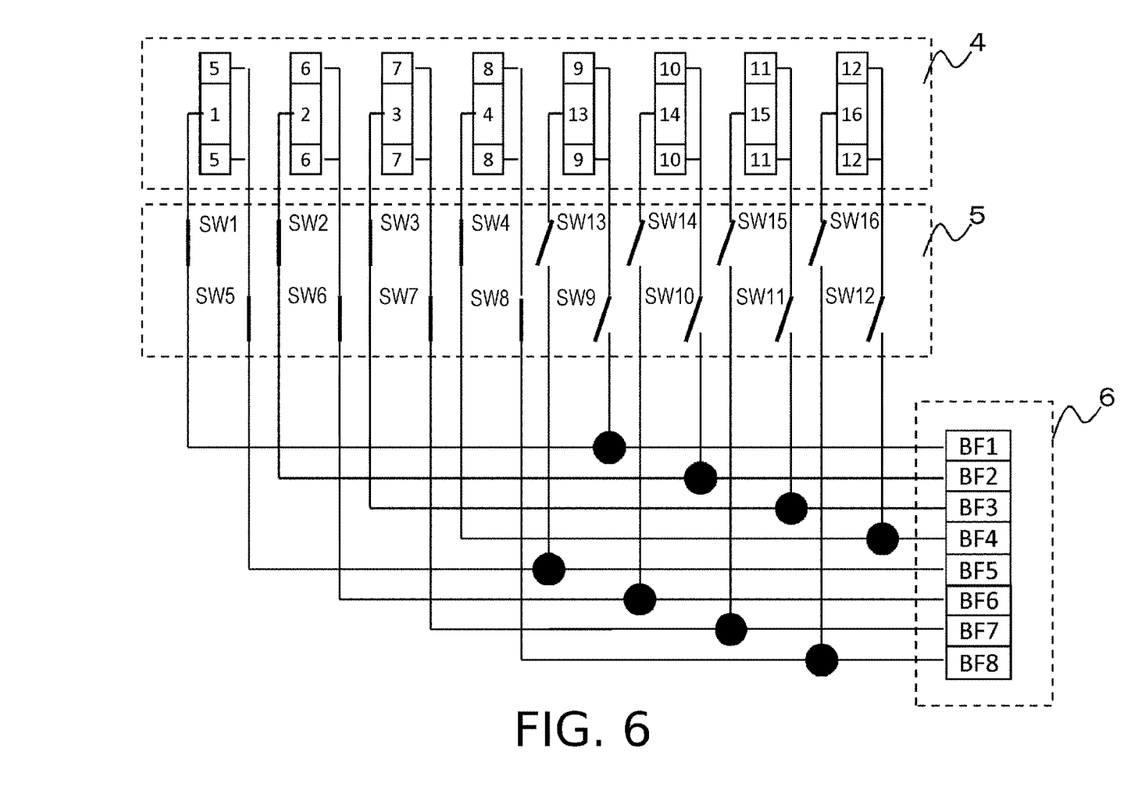
FIG. 6 is a view showing a configuration of a switch circuit unit according to a first embodiment.

FIG. 6 is a view showing a configuration of the switch circuit unit 5 according to this embodiment, and connections between the probe 4 and the transmission/reception circuit unit 6. The probe 4 has a tripartite 1.5D array structure including sixteen elements constituted by one row of central transducers and pairs of transducers at respective ends (wherein each pair of elements at the respective ends is counted as a single element). The single row of central transducers will be referred to as a central element row, and the two rows of elements at the respective ends will be referred to together as an end portion element row. In FIG. 6, when an array direction of the central element row is set as a first direction and a direction linking the respective pairs of the end portion element row is set as a second direction, the first direction and the second direction are orthogonal. However, it is sufficient for the first direction and the second direction to at least intersect.

Sixteen switch circuits (SW1 to SW16) of the switch circuit unit 5 are connected respectively to the transducers. By switching the respective switches ON and OFF, the switch circuit unit 5 can switch connections between the channels of the transmission/reception circuit unit 6 and the transducers of the probe 4. A plurality of transducers are provided as connection destination candidates for each channel, and the candidate transducer to be connected is determined by switching the switches ON and OFF. The probe 4 is controlled to operate in either 1.5D or 1D by controlling a connection method.

More specifically, transmission/reception circuits (BF1 to BF8) for eight channels are divided into equal-number first and second groups, each of which includes four channels. Further, of the sixteen transducers, the central element row is divided into two equal-number groups including four elements each, and the end portion element row is divided into two equal-number groups including four elements each. Control is then performed to determine the transducer groups to which the two groups of the transmission/reception circuit unit are to be connected. For example, when one of the transmission/reception circuit groups is connected to one group selected from the central element row and the other transmission/reception circuit group is connected to the end portion element row sandwiching the selected central element row, the probe 4 can be handled as a 1.5D probe having apertures corresponding to four elements in the lateral direction. When the two groups of the transmission/reception circuit are connected respectively to the two groups of the central element row, on the other hand, the probe 4 can be handled as a 1D probe having apertures corresponding to eight elements in the lateral direction.

The reason why this switch control is possible despite the limited number of transmission/reception circuit channels is that the respective channels are connected alternately to the transducers of the central element row and the transducers of the end portion element row. Looking at BF1 in FIG. 6, for example, BF1 is connected to SW1 corresponding to a transducer 1 of the central element row, and SW9 corresponding to a transducer 9 of the end portion element row, which is removed from SW1 by four elements (in other words, by an aperture width of the 1.5D array operation). Similarly, BF2 is connected to SW2 corresponding to a transducer 2 of the central element row and SW10 corresponding to a transducer 10 of the end portion element row, which is removed from SW2 by four elements. Thus, the transmission/reception circuits are connected to the transducers on the central element row and the transducers on the end portion element row alternately via the switches. According to this embodiment, therefore, the channels of the transmission/reception circuit unit are divided into two groups including four channels each, the channels in one of the groups are connected respectively to the switches of the central element row, and the channels in the other group are connected respectively to the switches of the end portion element row. As a result, aperture control can be realized at four aperture widths in the lateral direction during the 1.5D array operation.

When further transducers are hypothetically added to the right side of FIG. 6, BF1 is connected to the transducer belonging to the central element row immediately to the right of a transducer 16. At this time, the respective channels are connected to the transducers removed from the transducers belonging to the central element row by eight elements corresponding to the aperture width of the 1D array operation. As a result, 1D aperture control can be realized at a number of aperture widths corresponding to the number of channels of the transmission/reception circuit unit.

Hence, with the transmission/reception circuit unit 6 according to this embodiment, elevation aperture control having the characteristics of both a 1.5D array operation and a 1D array operation can be realized.

(Aperture Control by Switch Circuit Unit)

Figure 7:
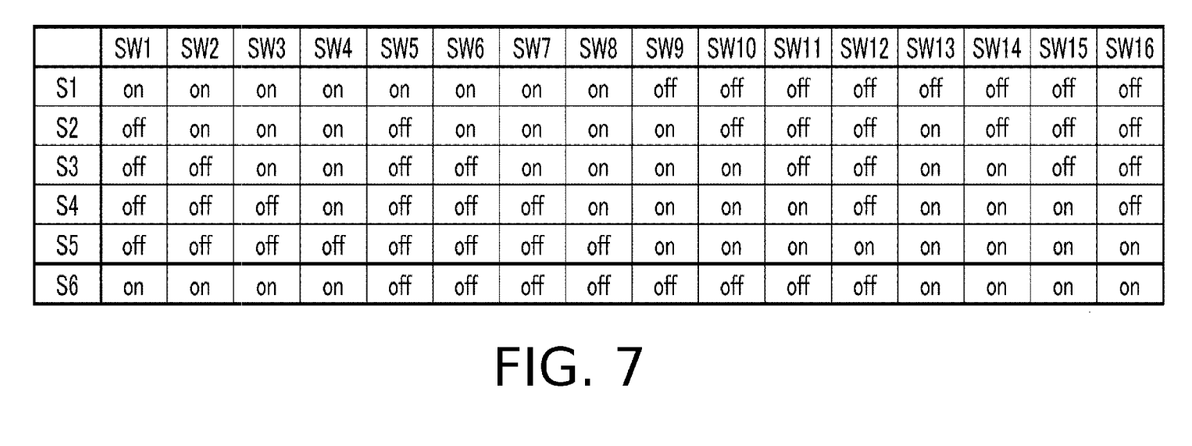
FIG. 7 is a view showing state transitions of the switch circuit unit.

FIG. 7 is a view showing state transitions of the switch circuits SW1 to SW16 when electronic scan control is performed at a four-element lateral aperture during a 1.5D array operation using the switch circuit unit 5 and when electronic scan control is performed at an eight-element lateral aperture during a 1D array operation using the switch circuit unit 5. S1 to S5 correspond to aperture control during the 1.5D array operation, while S6 corresponds to aperture control during the 1D array operation. Further, in FIGS. 8A to 8F, the transducers driven when the electronic scan control is performed as indicated by S1 to S6 are denoted by shading.

First, the 1.5D array operation using S1 to S5 will be described. In S1, the switch circuits SW1 to SW4 and SW5 to SW8 are switched ON and thereby connected respectively to the transmission/reception circuits BF1 to BF4 and BF5 to BF8. As a result, the four transducers from the left in the lateral direction are driven in the 1.5D array operation.

In S2, SW2 to SW4, SW13, and SW6 to SW9 are switched ON and thereby connected respectively to BF2 to BF5, BF6 to BF8, and BF1. As a result, the electronic scan is performed after shifting one element to the right side in the lateral direction. Thereafter, electronic scans are performed similarly after shifting one element at a time in the lateral direction in order of S3, S4, S5. By repeating this operation, electronic scan control during the 1.5D array operation can be executed as shown in FIGS. 8A to 8E.

Figure 8A:
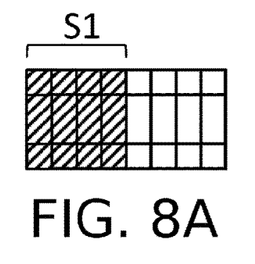
FIGS. 8A to 8F are views showing electronic scan control by the probe.
Figure 8B:
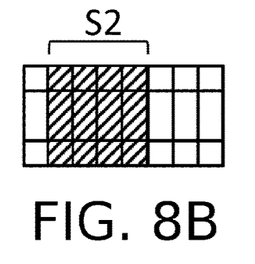
Figure 8C:
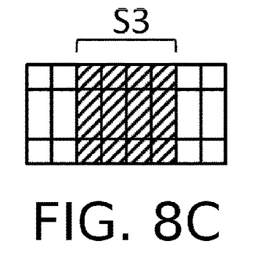
Figure 8D:
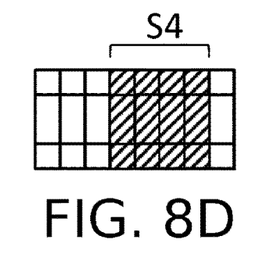
Figure 8E:
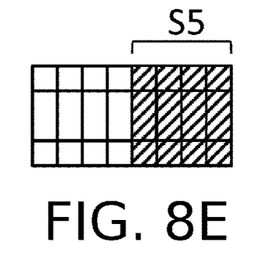
Figure 8F:
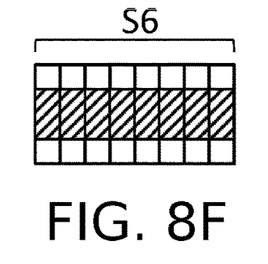

Next, the 1D array operation of S6 will be described. In the 1D array operation, only the transducers 1 to 4 and 13 to 16 in elevation direction central positions of the probe 4 are used. Hence, the switch circuits SW1 to SW4 and SW13 to SW16 are switched ON and thereby connected respectively to the transmission/reception circuits BF1 to BF4 and BF5 to BF8. In the 1D array operation, as shown in FIG. 8F, electronic scan control is performed using only the transducers in the elevation direction central positions of the probe 4, and therefore the lateral direction aperture can be increased from a four-element aperture to an eight-element aperture.

In this embodiment, the number of transducers constituting the probe 4 is described as being limited to sixteen, but in actuality, there are no limitations on the number of transducers, and a larger number of transducers (1000 or more, for example) may be used. Further, the number of channels of the transmission/reception circuits is not limited to eight, and the number of channels corresponding to the required electronic scan control and aperture width may be used.

As noted above, FIGS. 8A to 8F are views illustrating the electronic scan control performed by the probe 4, and show regions of the transducers that are driven in the respective switch connection states of S1 to S6. In S1 to S5, electronic scan control can be executed at a four-element lateral aperture during the 1.5D array operation, whereas in S6, the transmission/reception circuits are connected only to the central transducers, and therefore the elevation direction aperture is reduced to a single element. The lateral direction aperture increases to eight elements, however, and therefore the unique merits of the 1D array operation are obtained.

(Modification of Focus Depth)

Figure 9A:
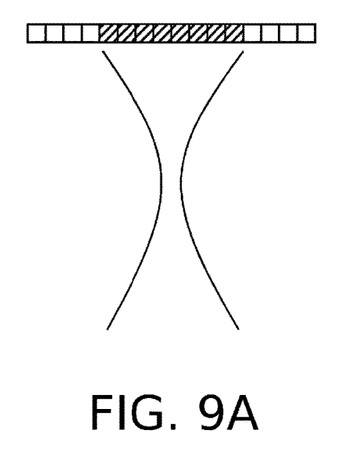
FIGS. 9A and 9B are views showing dynamic focusing corresponding to an aperture size.
Figure 9B:
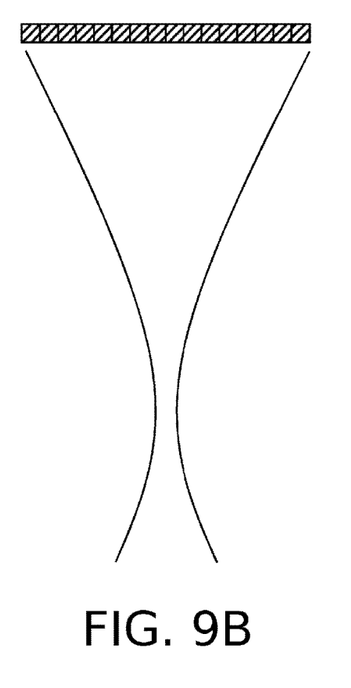

FIGS. 9A and 9B are views showing dynamic focus processing corresponding to the aperture size. More specifically, aperture size control is dynamic focus processing for generating an image using transducers, from among the transducers of the probe, that are in an active state. At this time, control is performed to vary the aperture size in accordance with a focus depth in order to make an azimuth resolution in the lateral direction of the tomographic slice image even. In other words, when a transmission frequency of an ultrasound wave is constant, the azimuth resolution of the entire image can be kept even by increasing the aperture size in accordance with an increase in the focus depth.

By increasing the aperture size as shown in FIG. 9B, in comparison to FIG. 9A, the azimuth resolution following an increase in the focus depth can be improved. Note, however, that the active transducers that determine the aperture size are connected as is to the transmission/reception circuits, and therefore the degree to which the azimuth resolution can be improved depends on the number of transmission/reception circuit channels that can be packaged in the apparatus.

With the 1.5D array in particular, elevation direction aperture control is performed simultaneously, and therefore channels must also be allocated to the end portion element row, leading to a reduction in the lateral direction aperture size. As a result, it is impossible to obtain a sufficient aperture size for the focus depth.

Hence, according to this embodiment, the 1.5D array operation is used in a shallow region to realize an improvement in the resolution through elevation direction aperture control, whereas in a deep region, an improvement in the azimuth resolution is achieved by increasing the size of the lateral direction aperture using the 1D array operation. By executing this control, an improvement in image resolution can be realized without increasing the number of transmission/reception circuit channels.

As regards a timing for switching between the respective operation modes at this time, the operation mode may be switched either in advance or during a transmission/reception operation. An optimum timing may be selected in accordance with image capturing conditions.

Note that a switch between the 1.5D array operation and the 1D array operation may also be realized by physically replacing the probe. However, in an apparatus that obtains image data by performing a mechanical scan using the probe 4, such as that shown in FIG. 4, it is not easy to replace the probe to be used. As a result, it is impossible to obtain an image by selecting an optimum probe in accordance with the focus depth of the observation subject.

By performing the aperture control according to this embodiment, on the other hand, it is possible to switch between the 1.5D array operation and the 1D array operation. Hence, when the focus depth is to be increased, for example, the aperture size can be increased by switching to the 1D array operation.

An ultrasound beam may also be focused in multiple stages in accordance with the depth of a target. Electronic focusing can be performed by exciting the transducers arranged on the probe at time differences, and by varying the delay times, a focal point distance can be adjusted. Accordingly, by providing a plurality of focal points, an optimum ultrasound beam width can be formed. This control is known as multi-stage focusing, and can be used favorably on a deep test subject, for example.

In multi-stage focusing, the 1D array operation and the 1.5D array operation are preferably switched in accordance with the depth of each transmission focus stage. A switch corresponding to the depth of the focus stage can be performed likewise during reception beam formation.

Further, electronic focusing can be performed by applying a delay time to the ultrasound wave in order to determine volume data during both transmission and reception of the ultrasound beam. This is known as dynamic reception focusing. Likewise in dynamic reception focusing, the 1D array operation and the 1.5D array operation can be switched as part of an aperture size control sequence.

Furthermore, the 1D array operation and the 1.5D array operation can be switched in accordance with the switch timing between transmission and reception.

According to this embodiment, as described above, a 1D array operation and a 1.5D array operation can be performed separately in an ultrasound diagnostic apparatus that generates three-dimensional image data using tomographic slice images obtained while moving a 1.5D array probe continuously in the elevation direction. In so doing, the image resolution of the tomographic slice images can be improved without increasing the number of transmission/reception circuit channels, and as a result, appropriate control corresponding to the focus depth, for example, can be performed.

Second Embodiment

Figure 10:
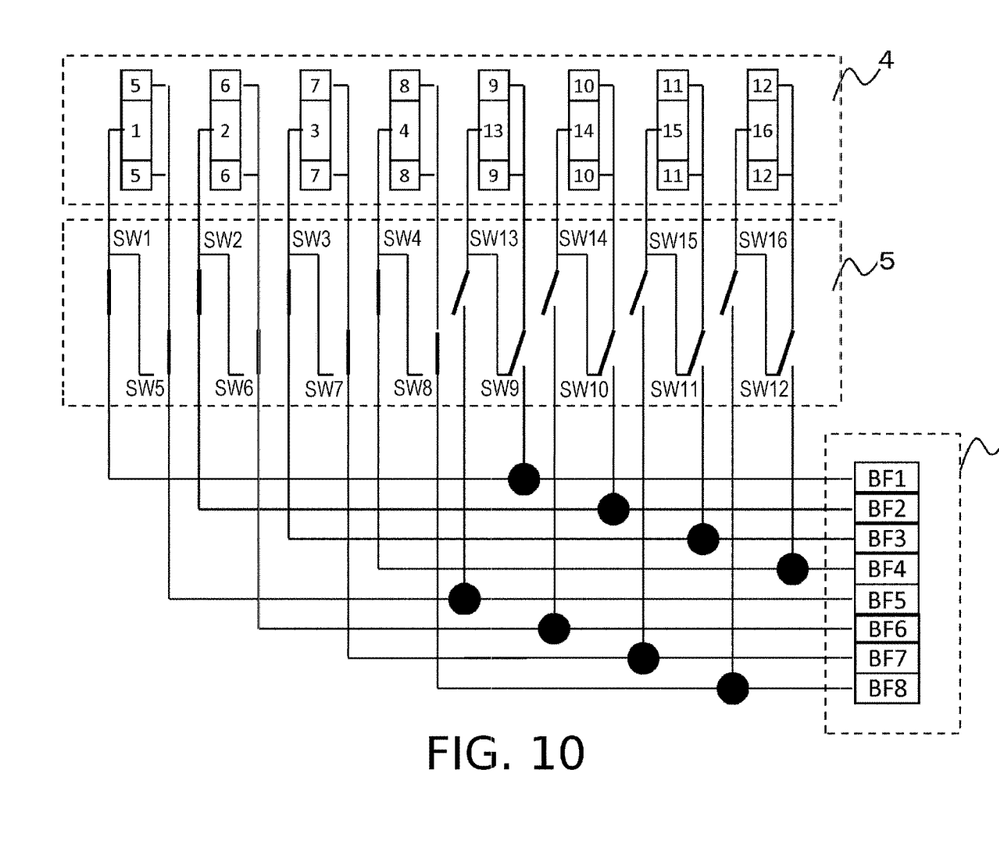
FIG. 10 is a view showing a configuration of a switch circuit unit according to a second embodiment.

FIG. 10 is a view showing a configuration of the switch circuit unit 5 according to a second embodiment, and connections between the probe 4 and the transmission/reception circuit unit 6. The probe 4 has a tripartite 1.5D array structure including sixteen elements constituted by one row of central transducers and pairs of transducers at respective ends. Similarly to the first embodiment, each pair of transducers at the respective ends is counted as a single element.

The sixteen switch circuits (SW1 to SW16) of the switch circuit unit 5 are connected respectively to the transducers. Similarly to the first embodiment, the switch circuit unit 5 switches the connections between the transmission/reception circuit unit 6 and the probe 4 as desired.

However, a switch structure of this embodiment differs from that of the first embodiment in that when the switch circuits connected to the elements at the respective ends are OFF, the elements at the respective ends are connected to the central elements. In other words, when aperture control is performed using the 1D array operation, the central elements and the elements at the respective ends can be driven together. When aperture control is performed using the 1.5D array operation, on the other hand, the central elements and the elements at the respective ends are driven separately, similarly to the first embodiment.

As regards the connections of the switch circuits, a method of switching between the 1.5D array operation and the 1D array operation is identical to that of the first embodiment, and therefore detailed description thereof has been omitted. In FIG. 10, SW1 to SW4 and SW5 to SW8 are ON, and therefore the probe 4 operates as a 1.5D array probe having a four-element aperture. When SW1 to SW4 and SW13 to SW16 are switched ON, on the other hand, the probe 4 operates as a 1D array probe, and the elements at the respective ends are also driven.

According to the second embodiment, as described above, when aperture control is performed by a 1D array operation using a 1.5D array probe, the central elements and the elements at the respective ends can be driven simultaneously, and therefore a sensitivity of the transmission/reception signal can be further improved.

Third Embodiment

In a third embodiment, a system constituted by switch circuits SW17 to SW24 that are connected to the central elements when the switch circuits SW5 to SW12, which are connected to the elements at the respective ends in the second embodiment, are OFF can be added.

Figure 11:
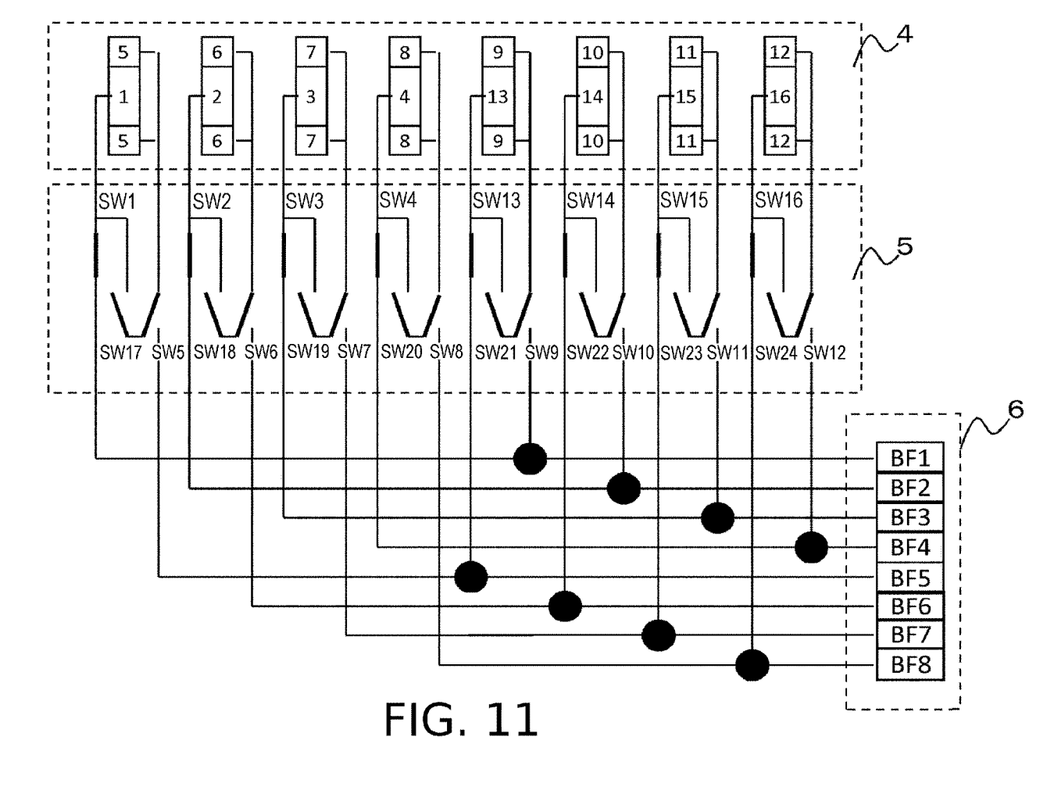
FIG. 11 is a view showing a configuration of a switch circuit unit according to a third embodiment.

This method will now be described using FIG. 11. In FIG. 11, the switch circuits SW17 to SW24 are added, and using these switches, the elements at the respective ends can be connected directly to the central elements as desired. In so doing, aperture control can be performed by a 1.25D operation in the elevation direction.

When aperture control is performed by a 1.25D operation, the central elements and the elements at the respective ends can be driven simultaneously, and therefore, not only can the lateral direction resolution be improved, but also, aperture control can be performed in two stages in the elevation direction.

According to the third embodiment, as described above, a 1.25D array operation and a 1.5D array operation can be performed separately in accordance with the focus depth using a 1.5D array probe, and in so doing, the image resolution of a tomographic slice image can be improved without increasing the number of transmission/reception circuit channels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-224135, filed on Oct. 9, 2012, which is hereby incorporated by reference herein in its entirety.

What is claimed is:

1. An acoustic wave measuring apparatus comprising:
a probe having a plurality of transducers that convert an acoustic wave into an electric signal and vice versa;

a transmitting and receiving unit that includes a plurality of channels to which the plurality of transducers is connected, generates an acoustic wave by applying an electric signal to the plurality of transducers, and receives an electric signal converted from an acoustic wave received by the plurality of transducers as a reception signal;

a switching unit including a plurality of first switches and a plurality of second switches for switching connections between the plurality of transducers and the plurality of channels; and a controller that controls an operation of the switching unit, wherein the plurality of transducers includes a central element row of transducers arranged in a first direction, and an end portion element row of transducers including a plurality of pairs of transducers, each of the pairs positioned to sandwich a transducer of the central element row in a second direction that intersects the first direction, and each of the plurality of channels is connected to one of the pairs of the end portion element row via a first switch and one of the transducers in the central element row that is positioned in a position different from the one of the pairs in the first direction via a second switch, respectively, such that a transducer in the central element row and a pair of end portion element row in an identical position in the first direction are connected to mutually different channels, further wherein the controller causes either of the first switch and the second switch connected to an identical channel to be in an ON state at one time.

2. The acoustic wave measuring apparatus according to claim 1, wherein the switching unit performs control to switch an operation of the probe between a 1D array operation and a 1.5D array operation.

3. The acoustic wave measuring apparatus according to claim 2, wherein the switching unit operates the probe as a 1D array by connecting all of the plurality of channels to the transducers on the central element row.

4. The acoustic wave measuring apparatus according to claim 3, wherein, when the probe is operated as the 1D array, the switching unit connects the plurality of channels to consecutive transducers on the central element row while disconnecting transducers on the end portion element row.

5. The acoustic wave measuring apparatus according to claim 2, wherein the switching unit operates the probe as a 1.5D array by dividing the plurality of channels into two groups of an equal number, connecting the channels in a first group to the transducers on the central element row, and connecting the channels in a second group to transducers on the end portion element row that sandwich the transducers to which the channels in the first group are connected.

6. The acoustic wave measuring apparatus according to claim 5, wherein, when the probe is operated as the 1.5D array, the switching unit connects the channels included in the first group to the consecutive transducers on the central element row, the number of the consecutive transducers being identical to the number of the channels included in the first group.

7. The acoustic wave measuring apparatus according to claim 2, wherein the probe transmits a generated acoustic wave to a test subject serving as a measurement subject, and receives an acoustic wave reflected by the test subject, and the image generating unit generates image data of an interior of the test subject.

8. The acoustic wave measuring apparatus according to claim 7, wherein the switching unit switches between the 1D array operation and the 1.5D array operation in accordance with a depth of the target test subject.

9. The acoustic wave measuring apparatus according to claim 7, wherein the switching unit switches between the 1D array operation and the 1.5D array operation in accordance with an aperture size of the probe.

10. The acoustic wave measuring apparatus according to claim 3, wherein, when the probe is operated as the 1D array, the switching unit connects the channels also to the transducers on the end portion element row positioned so as to sandwich the transducers on the central element row.

11. The acoustic wave measuring apparatus according to claim 3, wherein the switching unit further includes switches provided respectively for the plurality of channels and used when the probe is operated as the 1D array to switch between connecting and not connecting the channels also to the transducers on the end portion element row positioned so as to sandwich the transducers on the central element row.

12. The acoustic wave measuring apparatus according to claim 8, wherein the switching unit switches to the 1.5D array operation to focus on a first depth of the target test subject, and switches to the 1D array operation to focus on a second depth of the target test subject deeper than the first depth.

13. The acoustic wave measuring apparatus according to claim 12, wherein resolution of the image data is maintained in the 1D array operation and the 1.5D array operation.

14. The acoustic wave measuring apparatus according to claim 1, wherein all of the first switches connect corresponding transducers in the central element row while all of the second switches disconnect corresponding pairs of transducers in the end portion element rows from the channel.

15. The acoustic wave measuring apparatus according to claim 1, further comprising an image generating unit that generates image data on the basis of the reception signal.

16. A method of controlling a switching unit for an acoustic wave measuring apparatus having a plurality of first switches and a plurality of second switches for switching connections between a plurality of transducers of a probe that convert an acoustic wave into an electric signal and vice versa and a plurality of channels to which the plurality of transducers is connected, wherein the plurality of transducers includes a central element row of transducers arranged in a first direction, and an end portion element row of transducers including a plurality of pairs of transducers, each of the pairs positioned to sandwich a transducer of the central element row in a second direction that intersects the first direction, and each of the plurality of channels is connected to one of the pairs of the end portion element row via a first switch and one of the transducers in the central element row that is positioned in a position different from the one of the pairs in the first direction via a second switch, respectively, such that a transducer in the central element row and a pair of end portion element row in an identical position in the first direction are connected to mutually different channels, the method comprising:

causing either of the first switch and the second switch connected to an identical channel to be in an ON state at one time.

17. The method according to claim 16, further causing the switching unit to switch an operation of the probe between a 1D array operation and a 1.5D array operation.

18. The method according to claim 17, further causing the switching unit to operate the probe as a 1D array by connecting all of the plurality of channels to the transducers on the central element row.

19. The method according to claim 18, wherein, when the probe is operated as the 1D array, further causing the switching unit to connect the plurality of channels to consecutive transducers on the central element row while disconnecting transducers on the end portion element row.

20. The method according to claim 17, further causing the switching unit to operate the probe as a 1.5D array by dividing the plurality of channels into two groups of an equal number, connecting the channels in a first group to the transducers on the central element row, and connecting the channels in a second group to transducers on the end portion element row that sandwich the transducers to which the channels in the first group are connected.

21. The method according to claim 20, wherein, when the probe is operated as the 1.5D array, further causing the switching unit to connect the channels included in the first group to the consecutive transducers on the central element row, the number of the consecutive transducers being identical to the number of the channels included in the first group.

22. The method according to claim 18, wherein, when the probe is operated as the 1D array, causing the switching unit to connect the channels also to the transducers on the end portion element row positioned so as to sandwich the transducers on the central element row.

* * * * *